United States Patent [19]

Kraus

[11] Patent Number: 4,851,907
[45] Date of Patent: Jul. 25, 1989

[54] PICTURE DISPLAY DEVICE INCLUDING A FIELD NUMBER CONVERSION CIRCUIT

[75] Inventor: Uwe E. Kraus, Eindhoven, Netherlands

[73] Assignee: U.S. Philips Corporation, New York, N.Y.

[21] Appl. No.: 178,704

[22] Filed: Apr. 7, 1988

[30] Foreign Application Priority Data

Apr. 16, 1987 [NL] Netherlands ................... 8700903

[51] Int. Cl.$^4$ .............................................. H04N 7/01
[52] U.S. Cl. ..................................... 358/140; 358/148
[58] Field of Search ................ 358/140, 153, 148, 242

[56] References Cited

U.S. PATENT DOCUMENTS

| | | | |
|---|---|---|---|
| 3,806,644 | 4/1974 | Browne et al. | 358/140 |
| 4,047,204 | 9/1977 | Gold | 358/140 X |
| 4,587,557 | 5/1986 | Doornhein et al. | 358/140 |
| 4,651,209 | 3/1987 | Okada et al. | 358/140 |
| 4,680,632 | 7/1987 | Willis et al. | 358/140 X |
| 4,760,455 | 7/1988 | Nagashima | 358/140 |

Primary Examiner—James J. Groody
Assistant Examiner—Victor R. Kostak
Attorney, Agent, or Firm—Edward W. Goodman

[57] ABSTRACT

Picture display device including a field number conversion circuit provided with a synchronizing signal conversion circuit (4) in which the number of half-lines in a field of a television signal to be converted is counted by means of a counter (57). This number is passed on to a further counter (41) which counts at a rate which is different from that of the first-mentioned counter. The ratio between the counting rates of the counters is assumed to be equal to the ratio between the field numbers of a converted television signal and the television signal to be converted. Also in the case of possible deviations of the television signal to be converted from a standard signal, the further counter (41) places vertical synchronizing signals (V2) at the correct locations in the converted television signal.

4 Claims, 1 Drawing Sheet

PICTURE DISPLAY DEVICE INCLUDING A FIELD NUMBER CONVERSION CIRCUIT

BACKGROUND OF THE INVENTION

The invention relates to a picture display device including a field number conversion circuit converting a first television signal having a first field frequency into a second television signal having a second field frequency, and including a synchronizing signal conversion circuit deriving second horizontal and vertical synchronizing signals of the second television signal from first horizontal and vertical synchronizing signals of the first television signal, and comprising:

a phase-locked loop including an oscillator which generates a signal at a frequency which is a multiple of the first horizontal synchronizing signal (H1) and which is phase-locked to said first horizontal synchronizing signal, the second horizontal synchronizing signal (H2) being derived from an output signal of the oscillator, and a frequency divider circuit by means of which the second vertical synchronizing signal (V2) is derived from the first vertical synchronizing signal (V1), said circuit having an input which is coupled to an output of the oscillator.

A picture display device of this type is known from the PCT Application No. WO 80/02351. The frequency divider circuit of the picture display device described in that Application is adapted to process standard television signals with a standard number of lines per field. If television signals with a number of lines per field deviating from the standard are applied to this circuit, such as television signals from video recorders and video games, disturbing effects, such as a rolling picture or vertical jitter, occur.

SUMMARY OF THE INVENTION

The object of the invention is to enable non-standard (possibly interlaced) television signals to be processed without such disturbing effects.

According to the invention, the picture display device of the type described in the opening paragraph is therefore characterized in that the frequency divider circuit is a controllable counter circuit and in that the picture display device further comprises:

a counter having an erasing signal input for applying the first vertical synchronizing signal (V1) thereto and a clock signal input which is coupled to an output of the oscillator, a storage circuit having an input combination which is coupled to an output combination of the counter, a clock signal input for applying the first vertical synchronizing signal (V1) thereto and an output combination which is coupled to an input combination of the controllable counter, circuit, and an output circuit having an input for applying the first vertical synchronizing signal (V1) thereto and an input which is coupled to an output of the controllable counter circuit, the second vertical synchronizing signal (V2) being obtained from an output of the output circuit.

The inventive measure is realized in that the number of lines per field of the first television signal can be counted by means of the counter and in that the controllable counter circuit can be controlled by means of the counting result so as to supply a pulse of the second vertical synchronizing signal V2 after the same number of lines of the second television signal. The advantage of this measure is that a changing line number of the first television signal is followed very rapidly by an adaptation of the line number of the second television signal so that disturbing phenomena as described above are considerably reduced.

A further embodiment of the invention is characterized in that the second field frequency is twice the first field frequency. Due to this measure it is possible for both standard and non-standard television signals to double the field number while maintaining a possible interlacing.

BRIEF DESCRIPTION OF THE DRAWINGS

The invention will now be described in greater detail by way of example with reference to the accompanying drawing, in which.

DESCRIPTION OF THE INVENTION

Figure 1:
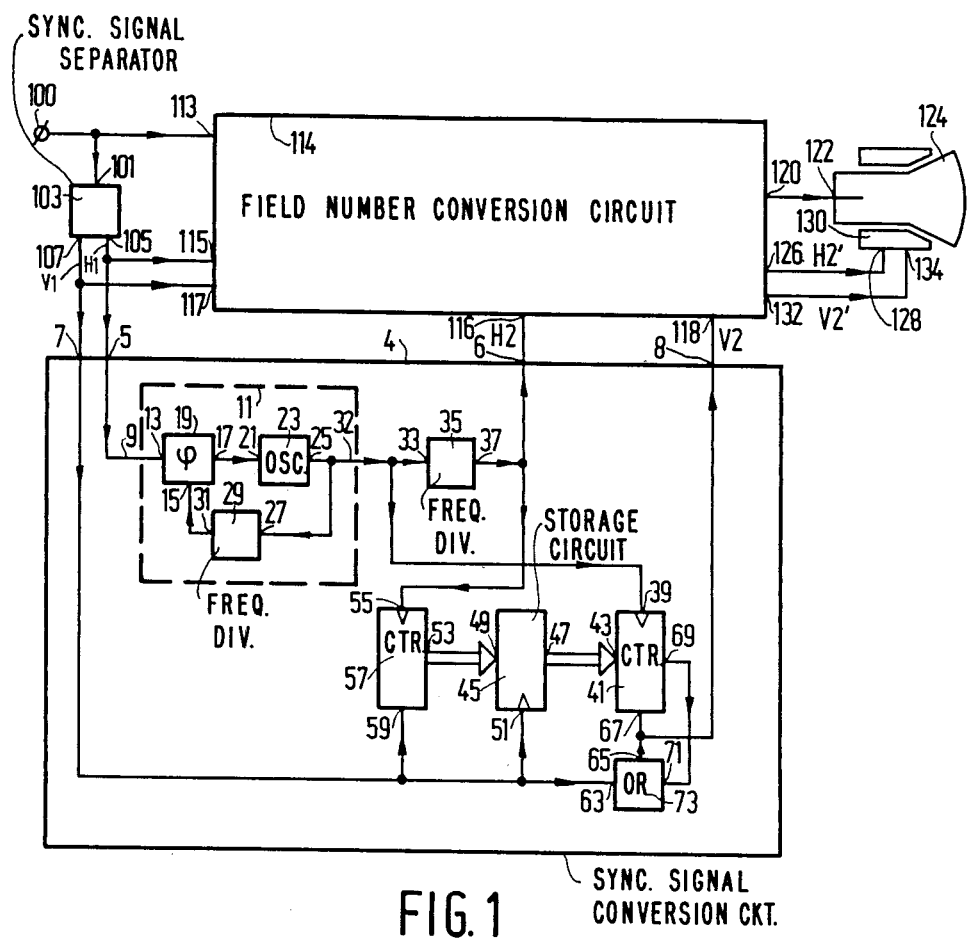
FIG. 1 shows, by way of a block diagram, a possible embodiment of a picture display device including a field number conversion circuit which is provided with a synchroizing signal conversion circuit according to the invention.

In FIG. 1, a first television signal is applied to an input 100 of a picture display device, which input is connected to an input 101 of a synchronizing signal separator 103 and to an input 113 of a field number conversion circuit 114. The synchronizing signal separator 103 has an output 105 for a first horizontal synchronizing signal H1 and an output 107 for a first vertical synchronizing signal V1. The output 105 of the synchronizing signal separator 103 is connected to an input 5 of a synchronizing signal conversion circuit 4 and to an input 115 of the field number conversion circuit 114. The output 107 of the synchronizing signal separator 103 is connected to an input 7 of the synchronizing signal conversion circuit 4 and to an input 117 of the field number conversion circuit 114. An output 6 for a second horizontal synchronizing signal H2 of the synchronizing signal conversion circuit 4 is connected to an input 116 of the field number conversion circuit 114. An output 8 for a second vertical synchronizing signal V2 of the synchronizing signal conversion circuit 4 is connected to an input 118 of the field number conversion circuit 114. A possibly multiple video signal output 120 of the field number conversion circuit 114 is connected to a possibly multiple video signal input 122 of a picture display tube 124. An output 126 for a horizontal deflection signal H2' of the field number conversion circuit 114 is connected to an input 128 of a deflection circuit 130 of the picture display tube 124. An output 132 for a vertical deflection signal V2' of the field number conversion circuit 114 is connected to an input 134 of the deflection circuit 130.

The input 5 of the synchronizing signal conversion circuit 4 is connected to an input 9 of a phase-locked loop 11 which is connected to an input 13 of a phase comparison circuit 19. A further input 15 of this phase comparison circuit 19 is connected to an output 31 of a first frequency divider 29. An output 17 of the phase comparison circuit 19 is connected to a control signal input 21 of an oscillator 23. An output 25 of this oscillator 23 is connected to an input 27 of the first frequency divider 29 and to an output 32 of the phase-locked loop 11 which is thus constituted by the phase comparison circuit 19, the oscillator 23 and the first frequency divider 29. The output 32 of the phase-locked loop 11 is connected to an input 33 of a second frequency divider 35 and to a clock signal input 39 of a controllable counter circuit in the form of a first counter 41. An output 37 of the second frequency divider 35 is connected to a clock signal input 55 of a second counter 57 and applies the second horizontal synchronizing signal H2 thereto, which signal is also applied to the output 6 of the synchronizing signal conversion circuit 4. The input 7 of the synchronizing signal conversion circuit 4 is connected to an erasing signal input 59 of the second counter 57, to a clock signal input 51 of a storage circuit 45 and to an input 63 of an output circuit in the form of an OR circuit 73. An input combination 49 of the storage circuit 45 is connected to an output combination 53 of the second counter 57. An output combination 47 of the storage circuit 45 is connected to an input combination 43 of the first counter 41. A load signal input 67 of the first counter 41 is coupled to an output 65 of the OR circuit 73 which supplies the second vertical synchronizing signal V2 thereto which is also applied to the output 8 of the synchronizing signal conversion circuit 4. A second input 71 of the OR circuit 73 is connected to a zero position signal output 69 of the first counter 41.

The operation of the circuit will now be described, assuming, by way of example, that the second field frequency is twice the first field frequency. In the circuit shown, it is then possible to cause the oscillator 23 to oscillate at a frequency of four times the frequency of the first horizontal synchronizing signal H1. It is alternatively possible to cause this oscillator to oscillate at a frequency which is a multiple thereof, if further components of the circuit are also adapted thereto. If the oscillator 23 oscillates at a frequency of four times the frequency of the first horizontal synchronizing signal H1, the first frequency divider 29 is a four-to-one divider and the second frequency divider 35 is a two-to-one divider. Since the second counter 57 receives a signal at the clock signal input 55 at a frequency which is twice the frequency of the first horizontal synchronizing signal H1 and receives the first vertical synchronizing signal V1 at the erasing signal input 59, this second counter 57 counts The double the number of lines of a field of the first television signal each time between two pulses of the first vertical signal V1. If a pulse of the first vertical signal is present V1 at the clock signal input 51, this number is stored in the storage circuit 45. The same V1 pulse is passed on via the OR circuit 73 to the load signal input 67 of the first counter 41 so that the number which has just been stored in the storage circuit is also charged in the first counter 41. Since this first counter 41 receives a signal at the clock signal input 39 at a frequency of four times the frequency of the first horizontal synchronizing signal H1, this first counter 41 counts back to zero from the number just loaded in this first counter 41 twice as fast as the second counter 57 counted double the number of lines. The first counter 41 will therefore have reached zero halfway through a field of the first television signal and will then supply a pulse of the second vertical synchronizing signal V2 for the second television signal via the OR circuit 73. Since the output 65 of the OR circuit 73 is connected to the load signal input 67 of the first counter 41, this first counter 41 will then again load the number stored in the storage circuit 45 and will again count back to zero from this number. Interlacing is then maintained, as will be described by way of a numerical example. If the first television signal comprises 312.5 lines per field, the second counter 57 will count until the position 625 is reached. Since the frequency of the clock signal of the first counter 41 is four times the first horizontal synchronizing frequency H1, a V2 pulse will be supplied after 156.25 lines of the first television signal, hence either halfway between two pulses of the second horizontal synchronizing signal H2 or coinciding with a H2 pulse.

The circuit is suitable for both standard and nonstandard signals because a pulse of the second vertical synchronizing signal V2 will be also halfway between two pulses of the first vertical synchronizing signal V1 if the number of lines between two pulses of the first vertical synchronizing signal V1 deviates from the normal number. The reason thereof is that the second counter has measured how many half lines are comprised in a field of the first television signal, and since the first counter counts twice as fast, a V2 pulse for the second television signal will be supplied halfway through a field of the first television signal. If it is not appreciated to maintain a possible interlacing, it is sufficient to count the number of full lines per field of the first television signal.

Figure 2:
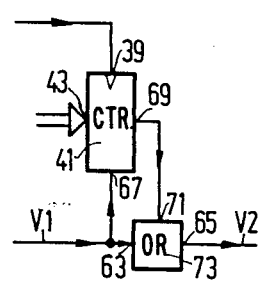
FIG. 2 shows, by way of a bock diagram, a possible output circuit for a second vertical synchronizing signal V2 of the synchronizing signal conversion circuit of FIG. 1 according to a further embodiment of the invention.

In FIG. 2 corresponding components have the same reference numerals as those in FIG. 1. The output circuit for the second vertical synchronizing signal according to FIG. 2 differs from the circuit shown in FIG. 1 in that the load signal input 67 of the first counter 41 is directly connected to the input 7 of the synchronizing signal conversion circuit 4 and in that the output 65 of the output circuit, which is also in the form of an OR circuit 73 in this Figure, is no longer connected to this load signal input 67 so that the load signal for the first counter 41 is no longer dependent on the zero position signal at the zero position signal output 69 of this first counter 41. The first counter 41 now counts back to zero only once between two V1 pulses of the first television signal in order to supply one V2 pulse between these two V1 pulses via the OR circuit 73. The V1 pulses themselves are also passed on as V2 pulses via this OR circuit 73. If the first television signal considerably deviates from a standard television signal, it may occur in the circuit according to FIG. 1 that two V2 pulses appear shortly after each other, with the first pulse originating from the zero position signal at the zero position signal output 69 of the first counter 41 and the second pulse originating from the first vertical synchronising signal V1. This phenomenon may occur if the number of lines per field of the first television signal varies from field to field. The embodiment described prevents two V2 pulses occurring shortly after each other as described hereinbefore. This embodiment is particularly favorable if the second field frequency is twice the first field frequency. If the second field frequency is another multiple of the first field frequency, the number of pulses supplied from the zero position signal output of the first counter can be counted by means of a counter circuit. In the case of an n-fold field number multiplication this counter circuit, upon having reached the position $n-1$, can apply a signal to an inhibition signal input of the first counter 41, thus preventing two V2 pulses appearing shortly after each other.

Both in the embodiment according to FIG. 1 and in the embodiment according to FIG. 2, for example an output of a NAND circuit having an input combination connected to an output combination of the first counter 41 can be used instead of the zero position signal output 69 of the first counter 41. Another alternative for this zero position signal output 69 of the first counter 41 is an output of a comparison circuit which has a first input combination connected to the output combination 47 of the storage circuit 45, and a second input combination connected to the output combination of the first counter 41 which now counts forward from zero. The signal which is applied to the load signal input 67 of this first counter 41 must then be applied to an erasing signal input of this first counter 41.

It is of course alternatively possible to realize synchronizing signal converters for field number converters other than only field number doublers by adapting the oscillator frequency of the oscillator 23 and the frequency ratios of the frequency dividers 29 and 35. Generally an n-fold multiplication of the field number can be realised by causing the oscillator 23 to oscillate at a frequency which is equal to 2n times the frequency of the first horizontal synchronizing signal H1 and by constituting the first frequency divider 29 as a 2n-to-one divider and the second frequency divider 35 as an n-to-one divider. In this case 2n must be an integer.

What is claimed is:

1. A picture display device including a field number conversion circuit converting a first television signal having a first field frequency into a second television signal having a second field frequency, and including a
    synchronizing signal conversion circuit deriving second horizontal and vertical synchronizing signals of the second television signal from first horizontal and vertical synchronizing signals of the first television signal, and comprising:
    a phase-locked loop including an oscillator which generates a signal at a frequency which is a multiple of the first horizontal synchronizing signal (H1) and which is phase-locked to said first horizontal synchronizing signal, the second horizontal synchronizing signal (H2) being derived from an output signal of the oscillator ; and
    a frequency divider circuit by means of which the second vertical synchronizing signal (V2) is derived from the first vertical synchronizing signal (V1), said circuit having an input which is coupled to an output of the oscillator, characterized in that the frequency divider circuit is a controllable counter circuit, and in that the picture display device further comprises:
    a counter having an erasing signal input to which the first vertical synchronizing signal (V1) is applied and a clock signal input which is coupled to the output of the oscillator ;
    a storage circuit having an input combination which is coupled to an output combination of the counter, a clock signal input receiving the first vertical synchronizing signal (V1), and an output combination which is coupled to an input combination of the controllable counter circuit ; and
    an output circuit having an input for receiving the first vertical synchronizing signal (V1)
    and an input which is coupled to an output of the controllable counter circuit, the second vertical synchronizing signal (V2) being obtained from an output circuit.

2. A circuit as claimed in claim 1, characterized in that the output of the controllable counter circuit is a zero position signal output of said counter circuit.

3. A circuit as claimed in claim, 1 characterized in that the second field frequency is twice the first field frequency.

4. A circuit as claimed in claim 3, characterized in that the frequency of the oscillator is four times the first horizontal synchronizing frequency (H1).

* * * * *